United States Patent
Vecchio et al.

(10) Patent No.: US 8,127,043 B2
(45) Date of Patent: Feb. 28, 2012

(54) NETWORK TRANSCODING SYSTEM

(76) Inventors: John Vecchio, Lawrenceville, GA (US); James Tanner, Alpharetta, GA (US); Thomas Campbell, Chamblee, GA (US); Drake Henderson, Winder, GA (US)

( * ) Notice: Subject to any disclaimer, the term of this patent is extended or adjusted under 35 U.S.C. 154(b) by 105 days.

(21) Appl. No.: 12/620,432

(22) Filed: Nov. 17, 2009

(65) Prior Publication Data

US 2010/0131674 A1    May 27, 2010

Related U.S. Application Data

(60) Provisional application No. 61/115,502, filed on Nov. 17, 2008.

(51) Int. Cl.
*G06F 15/16* (2006.01)

(52) U.S. Cl. .......................... 709/246; 709/229

(58) Field of Classification Search .................. 709/201, 709/203, 238–239, 246–247, 212–219, 226; 718/102–105; 386/353–357
See application file for complete search history.

(56) References Cited

U.S. PATENT DOCUMENTS

| | | | |
|---|---|---|---|
| 2003/0158913 A1* | 8/2003 | Agnoli et al. ................. | 709/219 |
| 2007/0162487 A1* | 7/2007 | Frailey .......................... | 707/102 |
| 2008/0019666 A1* | 1/2008 | Kato et al. .................... | 386/96 |
| 2009/0172685 A1* | 7/2009 | Shavit .......................... | 718/103 |

* cited by examiner

*Primary Examiner* — Brendan Higa
(74) *Attorney, Agent, or Firm* — DLA Piper LLP (US)

(57) ABSTRACT

The system is a distributed video transcoding system that allows content to be transformed from one digital format to another close to the ingest and delivery points to minimize the time and cost of the transfer between end points. Additionally by making transcoding an integral part of the distribution of content itself, significant efficiencies can be gained. The distribution can be improved by transcoding at different phases of the transfer. Within the system decisions can be made to utilize different transcoding resources based on various business rules and priorities.

6 Claims, 8 Drawing Sheets

NETWORK TRANSCODING SYSTEM

RELATED APPLICATION

This patent application claims priority to U.S. Provisional Patent Application 61/115,502 filed Nov. 17, 2008 which is incorporated herein in its entirety.

BACKGROUND OF THE SYSTEM

1. Field

The system is in the technical field of video transcoding. More particularly, the present system is in the technical field of video transcoding in a distributed network.

2. Background

There is a large library of video and other media available on the internet today. In addition, more media is being added on a daily basis. Much of the media is stored as Flash or other file formats and stored on Web servers for use by web plug-ins on sites such as YouTube, Break.com, MetaCafe.com, and. MySpace Video. These same sites are generating thousands of new files of media content daily. The ability to watch and share media on the internet has become a popular habit and users expect to continue to be able to view media content on their computers and other web-enabled devices, as well as on traditional televisions.

The migration from an analog to a digital television infrastructure has improved picture quality, but very little has been done to improve the variety and availability of digital content that can be delivered over this new infrastructure. Viewers have access to more content, but typically it's more of the same content delivered in much the same fashion as has been available in the past.

Consumers of content are more and more eschewing the choices available on television and choosing to experience the greater variety and instant access of content provided in the digital world of the internet and browser enabled devices. Many consumers have shut down their television viewing and obtain all content via web enabled devices.

A disadvantage of television is that nearly all traditional television content is available legally (via viewing sites such as hulu.com, youtube.com, metacafe.com, etc.) or illegally (via torrent streams, pirate content web sites, and unregulated peer to peer sharing). By contrast, web content is not easily viewable on television.

One problem in providing new content for use in television is the requirement for transcoding the content from a native format to a format that is suitable for viewing at a destination device. "Transcoding" refers to the conversion of one codec to another. In the video context, there are a number of codecs used for playback of digital video data. Often a video player does not support all types of codecs. Ha user would like to playback a video source in an incompatible codec, the data source must be transcoded to a compatible codec.

Conventional transcoding systems and products do not account for the distributed geographical nature of high quality content. High quality content requires large file sizes. In some cases, these large files are located in distributed geographical locations. There are issues that arise from ingesting content from those locations and then distributing the content to various locations around the world. For example, due to the large file size of the high quality content in many instances the content is shipped via physical media (tape, digital storage) to a destination location where it can then be transcoded. This results in a manual and labor intensive process. This system discourages or even prevents the distribution and use of higher quality video sources as source material. This limits the data sources which can be transformed in many ways specific to the end user devices.

BRIEF SUMMARY OF THE SYSTEM

The system provides a simple infrastructure and process for delivering, processing, and managing media for play-out to television viewers as on-demand or micro-niche channels on cable, IPTV, satellite, and over-the-top service provider networks. The system is a distributed video transcoding system that allows content to be transformed from one digital format to another close to the ingest and delivery points to minimize the time and cost of the transfer between end points. Additionally by making transcoding an integral part of the distribution of content itself, significant efficiencies can be gained. The distribution can be improved by transcoding at different phases of the transfer. Within the system decisions can be made to utilize different transcoding resources based on various business rules and priorities.

DETAILED DESCRIPTION OF THE SYSTEM

The system permits the retrieval of content from a variety of sources and content providers and allows that content to be efficiently delivered via service providers to television viewers. The content providers can be amateur video, professionally developed content, standard definition (SD), high definition (HD), and the like. The system handles all contribution, optimization, transcoding, error checking, and approval functions. The system includes a rules and scheduling engine to help providers manage content.

The service providers can then deliver the content to the end user through a variety of delivery mechanisms, including satellite television, cable television, Vudu, Tivo, and even manufacturer provided content delivery services that may be built in to sets such as those by Samsung, LG, and others.

Content Providers are provided in one embodiment with a web portal that allows the providers to control the process of contributing, approving, and scheduling media, which is then delegated through centrally administered user permissions and account rules. Permissions and rules are configurable by service providers and content owners and are designed to account for licensing arrangements between content and service providers.

Amateur and enthusiast media contribution: This content is typically user- or community-generated (e.g., school, government, or other civic organizations) and specified for distribution to one or more service providers in a community. Producers' wishing to contribute content set up an account, upload content, and enter some information about that clip. The service provider is then responsible for approving the content and scheduling it to the appropriate VOD category or local digital channel.

Professional content providers: While the Web interface is available for basic contribution, a more robust integration interface is provided for professional content providers who need to move large amounts of content rapidly and reliably. In addition, batch or automated FTP, RSS, and third-party high-speed transfer solutions are supported.

Metadata may also be entered through the Web interface, and support for direct XML file transfer and ingest is also supported. Improperly formatted or missing metadata that cannot be interpolated by the system is automatically flagged for attention and can be manually added or edited as required.

Upon successfully acquiring new content, the video file is analyzed to verify that it can be successfully transcoded to any one of the multiple formats supported by downstream production systems. Based on this analysis, a variety of video adjustments and filters may be applied to optimize the content for presentation on television. To speed the optimization process and to ensure consistency, source-based optimization templates can be applied to content from specific sources or providers. Adjustments and filters can include color correction, macro block smoothing, sharpening, re-scaling, noise reduction, brightness, gamma, contrast, and others.

The system can also normalize or convert audio information, since many set-top boxes—particularly legacy cable set-tops—have very specific requirements regarding audio support. If available, other subcarrier data such as closed captioning and embedded metadata can also be analyzed and converted to the appropriate format for use by set-top boxes, televisions, and over-the-top devices.

Once the content has been converted to a high-quality, robust format and staged in the a system media center, the content can then be scheduled and queued for processing to specific formats required. Among the formats supported are Standard Definition and High Definition MPEG-2, MPEG-4 /h.264, and Flash. As a part of the transcoding process, attention is paid to GOP structure, bit-rate, resolution, and audio to verify that the resulting output meets the requirements of each format's respective destination device.

The system incorporates a metadata-based rules engine that allows content contributors or service providers to define content lifecycles. Metadata lives alongside the video asset and defines license window dates, description, usage, formats, location, talent, and a variety of other information that defines the content and how and where it can be used.

Media scheduling also includes defining what content is included in a VOD package or on a digital broadcast channel. A single clip can be utilized or an entire playlist of clips can be organized to create a package, program, or even an entire digital broadcast channel of content. Content conflicts due to differing usage rules are flagged and removed where appropriate.

Access to media scheduling capabilities is defined by each user profile and can be modified to suit a particular content provider or service provider's desired workflow. For example, content acquisition and scheduling may be handled for a particular VOD category by the content provider, while the service provider maintains control over publication and distribution.

Figure 4:
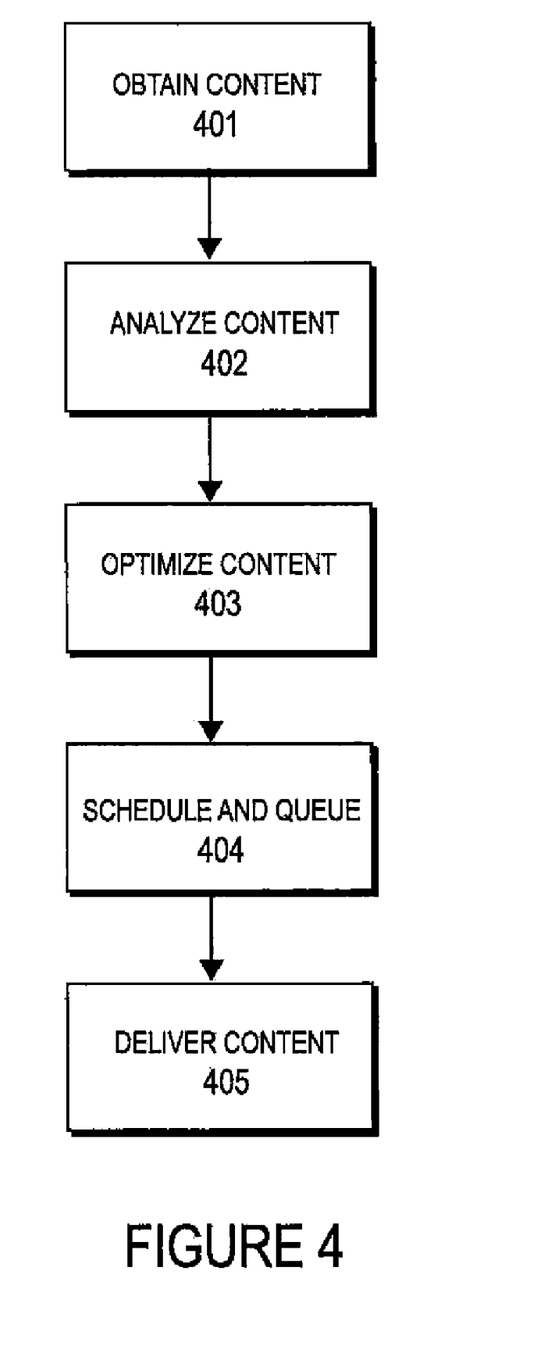
FIG. 4 is a flow diagram illustrating the operation of an embodiment of the system.

FIG. 4 is a flow diagram illustrating the operation of an embodiment of the system. At step 401 content is acquired by the system. As noted above, this content can be amateur or professional, and may be in any of multiple formats and styles. The ultimate destination for the content is determined by the content provider and the service provider. The content may be intended to be used individually and/or as part of a package of content. It may be intended for video-on-demand (VOD) and/or for regularly scheduled programming.

At step 402 the content is analyzed to determine if any optimization of video or audio is required for the intended use of the content. At step 403 the content is optimized for its intended use and destination. As noted above, the system is capable of supporting a number of input and output formats. Input formats include, but are not limited to, MPEG-2, MPEG-4, H.264, Flash, QuickTime, Windows Media, and the like. Output formats include, but are not limited to, MPEG-2, H.264, Flash, and the like.

At step 404 the content is scheduled and queued for processing to specific formats to be used by one or more of the distributed data centers of the system. In some cases, the content will need to be transcoded to one or more end formats depending on the service provider. The transfer time and transcoding requirements affect system resource usage and capability, so the system uses a management system and decision engine to optimize the system resources and transfer management of the content. At step 405, the content is delivered as scheduled.

The system contemplates a plurality of geographically distributed data centers. Transcoding is scheduled at geographically appropriate and capability appropriate data centers to maximize efficiency based on the service provider timing and physical requirements and format capabilities.

Figure 1:
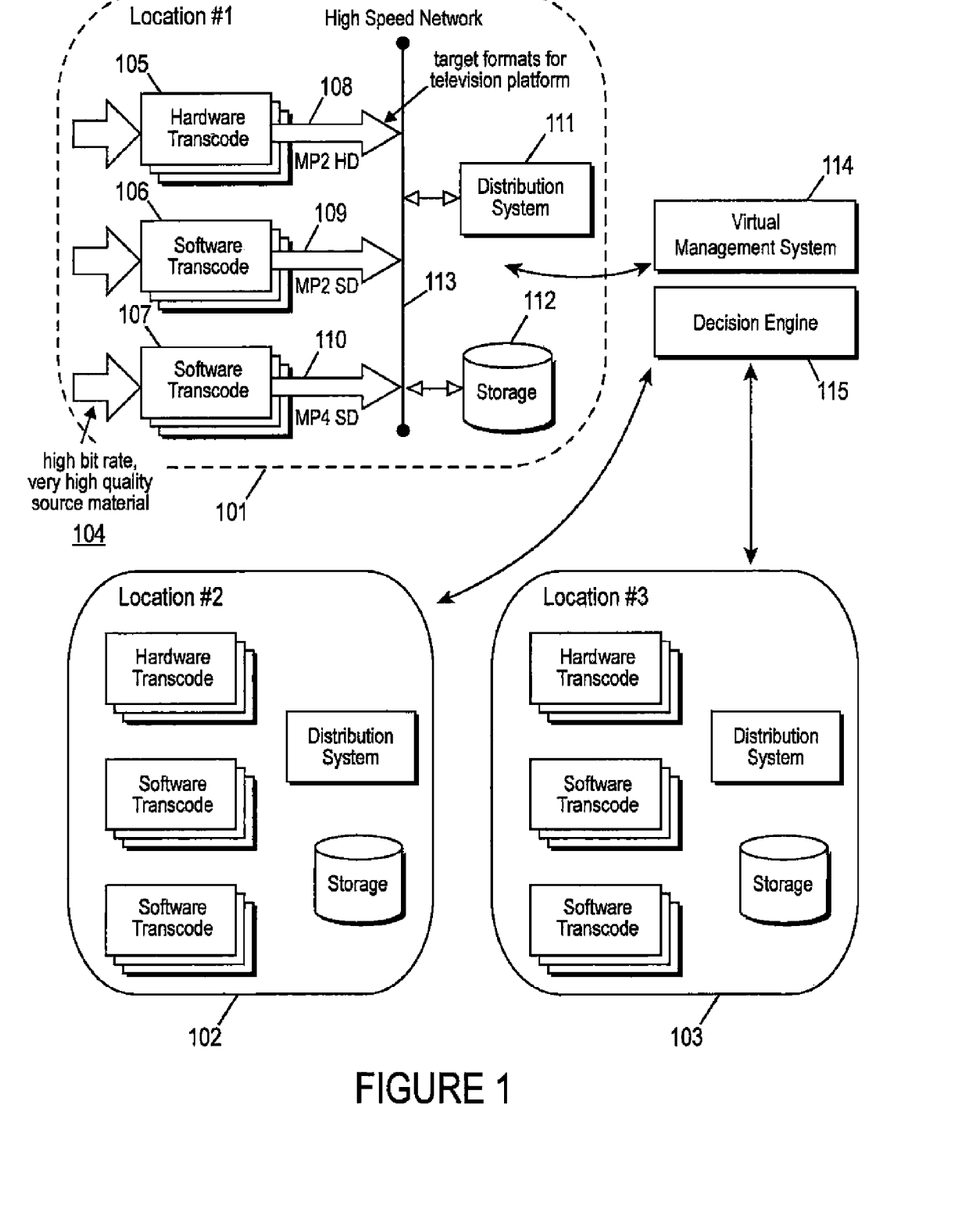
FIG. 1 is a block diagram of one embodiment of a video transcoding system.

FIG. 1 illustrates an embodiment of the system of distributed data centers. In FIG. 1 transcoding resources are distributed amongst multiple data centers 101, 102, and 103. Each data center includes its own connectivity, hardware resources, and known constraints of downstream systems. While the link to each data center is configured for a specific link speed, actual throughput is monitored and an average link speed is included in decision making algorithms. Consistently under-performing links are flagged and addressed by a network administrator. Hardware resources of the data center itself are considered in scheduling decisions, including local storage, file transfer, and LAN performance. Downstream systems also typically have quantifiable performance limitations that must be taken into account to ensure reliable, on-time delivery. These may include a multi-second delay for live events which affects interactivity or a multi-hour delay for VOD content propagation which changes when the content is available for viewing.

Each data center is positioned to be close to sources of high quality video and destination points allowing private and peering connections to the transcoding system. Within each data center several types of transcoders can exist depending on the requirements of each data center. The data center may support a specific category of customers which may lead to a different set of transcoding resources for each location.

By using, different data centers, combined files can be encoded at different locations. For example, an embedded advertisement can be encoded at one location while the content with which the ad will be combined can be encoded at another data center. The two can be combined just prior to delivery at a distribution data center.

Data center 101 includes access to high bit rate, high quality source material 104. The source materials 104 is provided to a plurality of transcoders. In the embodiment of FIG. 1, data center 101 includes a hardware transcoder 105 that outputs MP2 HD signal 108, a first software transcoder 106 that outputs MP2 SD signal 109, and a second software transcoder 107 that outputs MP4 SD signal 110. These outputs 108, 109, and 110 are coupled via bus 113 to data storage 112 and distribution system 111. The distribution system manages sources and destinations of content delivery.

Similarly, data centers 102 and 103 each may include one or more types of transcoders as well as their own local distribution systems and data storage. All of the data centers are controlled by a virtual management system 114 and decision engine 115.

The transcoding resources can be grouped as pools that encode to a different set of requirements. In some cases a pool or resources will be needed for handling high definition (HD) or standard definition (SD) or possibly internet video content. The virtual management system 114 coordinates the use of transcoding resources between each data center and coordinates the ingest and distribution of content across the network. Additionally it abstracts the use of each transcoder so it appears as a generic resource to be used by the system.

The virtual management system actively manages processing (e.g. CPU's) in each transcoding resource. It is aware of the number of CPUs that a transcode operation requires, and will not begin a job that requires more CPUs than are available. Once a job is begun, the required CPUs are reserved by that job. This allows the system to incorporate the best of breed available transcoders and allow seamless upgrades as technology evolves. The virtual management system 114 will allocate for best use which can mean optimal use at one location. However if those resources are constrained another resource could be used at another location. Therefore a content file can be moved around on the network transparently.

Figure 5:
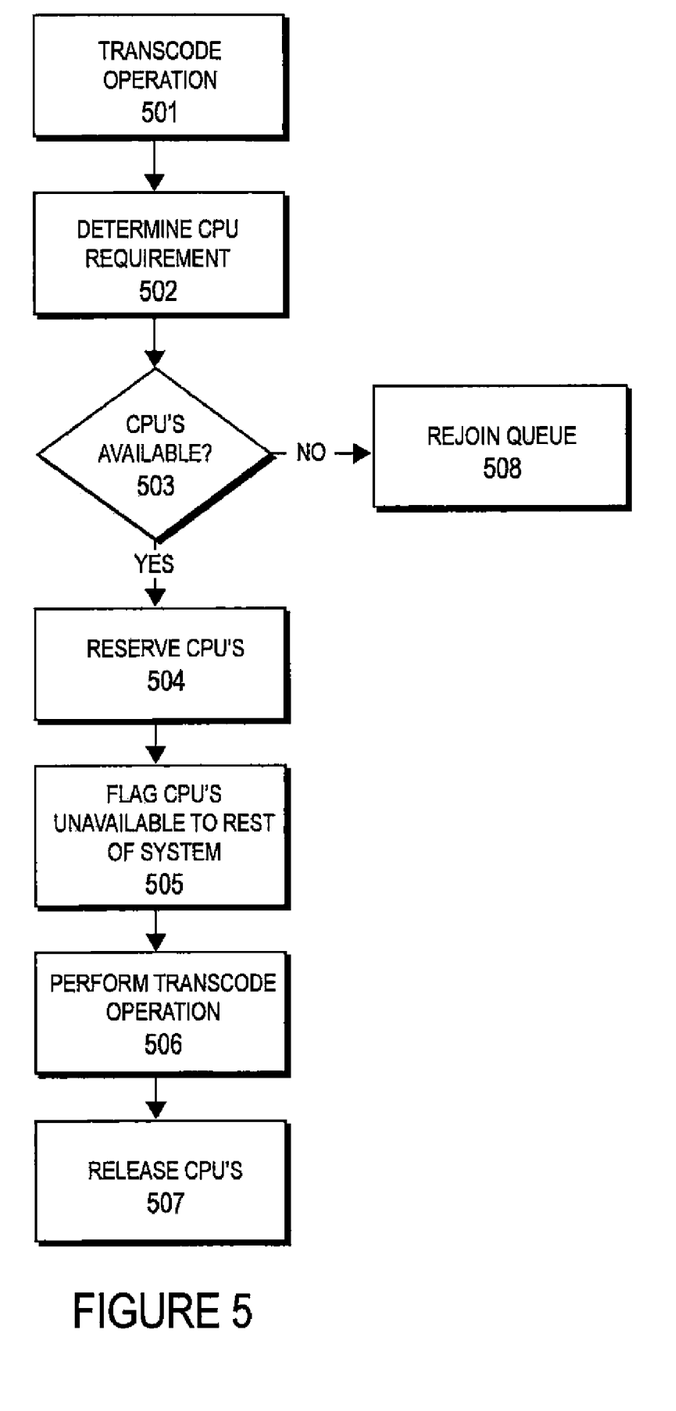
FIG. 5 is a flow diagram illustrating an embodiment of the system.

FIG. 5 is a flow diagram illustrating the operation of the system in managing processing. At step 501 a transcode operation is scheduled to begin. At step 502 the system determines the number of CPU's that the transcode operation requires. At decision block 503 the system checks to see if there is sufficient processing power (e.g. number of CPU's) available. If so, the system proceeds to step 504 and reserves the number of CPU's required. At step 505 those CPU's are flagged as unavailable to the rest of the system. At step 506 the transcoding operation is performed. At step 507 the operation is completed and the CPU's are released.

If there are not sufficient CPU's at decision block 503, the system proceeds to step 508 and rejoins the queue. In this queue, its priority is the overall priority of the job is, as described below. When a job is deferred and a higher-priority job arrives, the system will process the higher-priority job when resources become available. Since priority takes time until job due into account, as deferred jobs get older, their priority naturally increases. This way, a job won't be deferred indefinitely.

Figure 2:
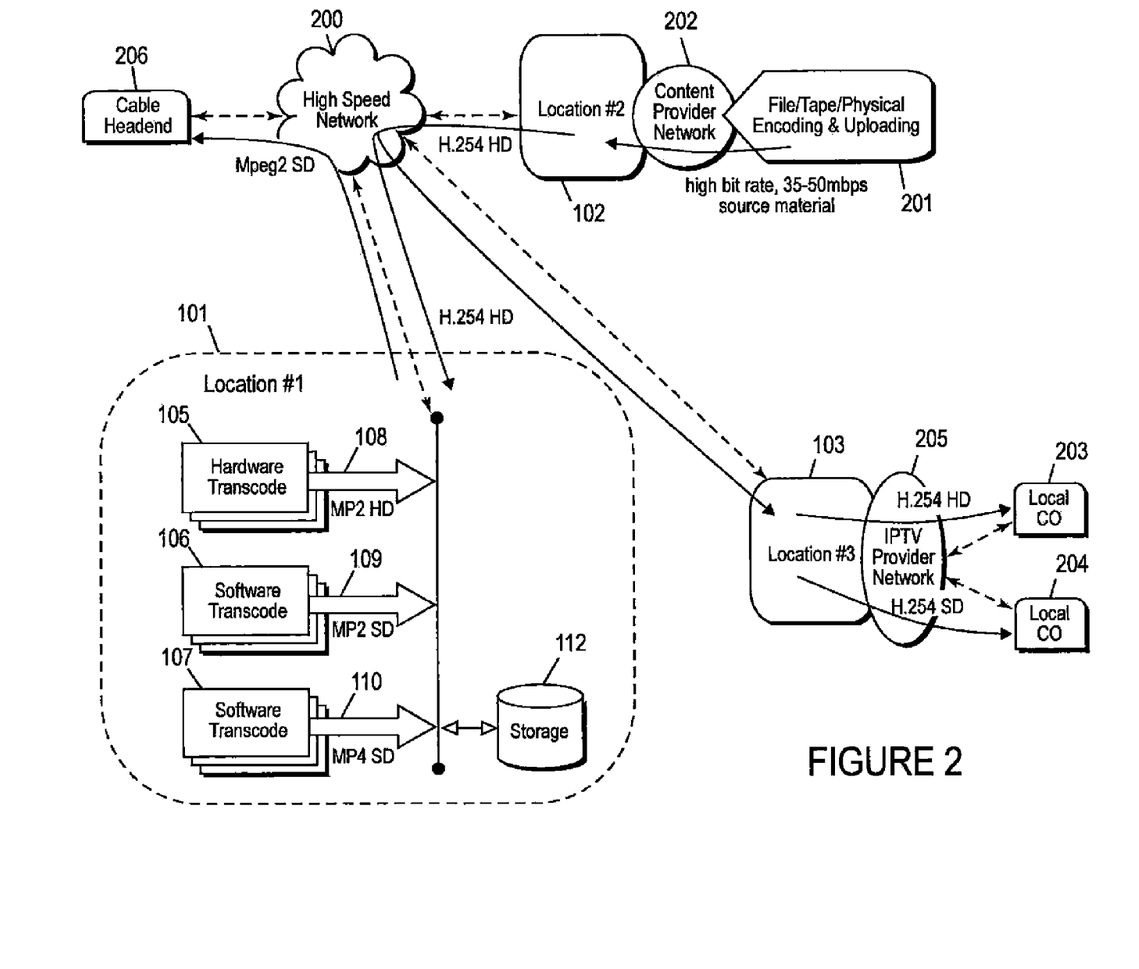
FIG. 2 is a block diagram of a network view showing a possible ingest and distribution scenario.

FIG. 2 illustrates a network view of a possible embodiment of the system of FIG. 1. In FIG. 2 the transcoding system is shown managing the ingest of a high quality video. Here the file 201 is at data center 102. The file is provided via content provider network 202 to data center 102. Data center 103 includes local CO's 203 and 204 communicating via IPTV provider network 205 with data center 103. Data center 1.01 is configured as described in FIG. 1. All three data centers can communicate amongst each other via high speed network 200. Cable headend 206 is coupled to the data centers via network 200. The CO 203 or 204 can access content that is available for streaming and make it available to network users or subscribers.

Once the file is ingested the decision engine 115 decides to use H.264 as it's internal source file for generating other formats that will ultimately be delivered to two destination points. The system routes the source file to data center 103 which is close to the IPTV provider 205. Once it arrives at data center 103 it can be passed directly to the provider as one of the required formats at the destination. The data center 103 can then down convert the source file to standard definition and deliver it to the IPTV provider 205. By providing close proximity and direct network connections the video file can be transferred quickly between the source and destination.

In FIG. 2 the internal source file is also routed to data center 101 for processing and distribution. Since this data center typically services cable customer 206 requiring MP2 as their preferred format the transcoding resources at that location primarily support that format. It contains transcoding resources for MP2 that support standard definition, high definition, and much lower quality MP2 for the processing of internet style video.

In another possible scenario in FIG. 2 a separate piece of content (e.g. advertisement) can be ingested into the system with the intent that it will be concatenated with a piece of content already in the system. The final combination of these two files can happen at the just-in-time to enable the most efficient use of transcoding and distribution.

Figure 3:
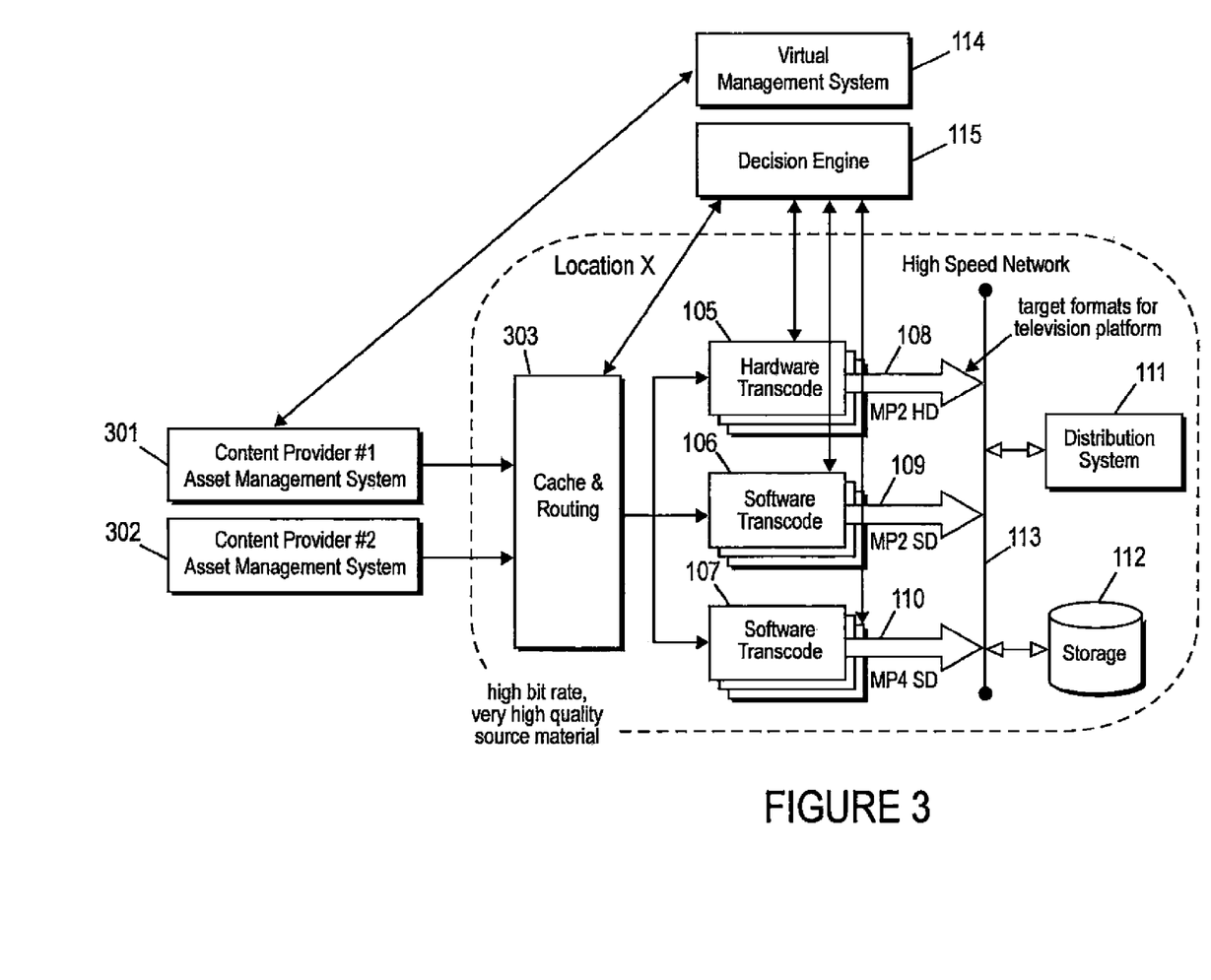
FIG. 3 is a block diagram that shows an embodiment of decision scenarios that can be made by the system.

FIG. 3 illustrates decision scenarios in an embodiment of the system. In FIG. 3 the virtual management system 114 coordinates the ingest of video from different content providers that have close proximity to the transcoding systems data center. The decision engine 115 routes the video files to the appropriate transcoding resources depending on the source format and required destination format.

Decision Engine

The decision engine makes decisions about scheduling and routing based on priority and affinity. The decision engine 115 also determines the best type of transcoder and which specific resource to use based on priority and affinity. "Priority" ranks the jobs' relative importance to one another. Priority can be determined by value of the content and delivery dates required by the customer.

"Affinity" determines which job a given transcoder or cluster prefers to process from the list of highest-priority jobs. Affinity can be determined by the delivery dates, cost to process and load balancing across all available transcoding resources.

Figure 8:
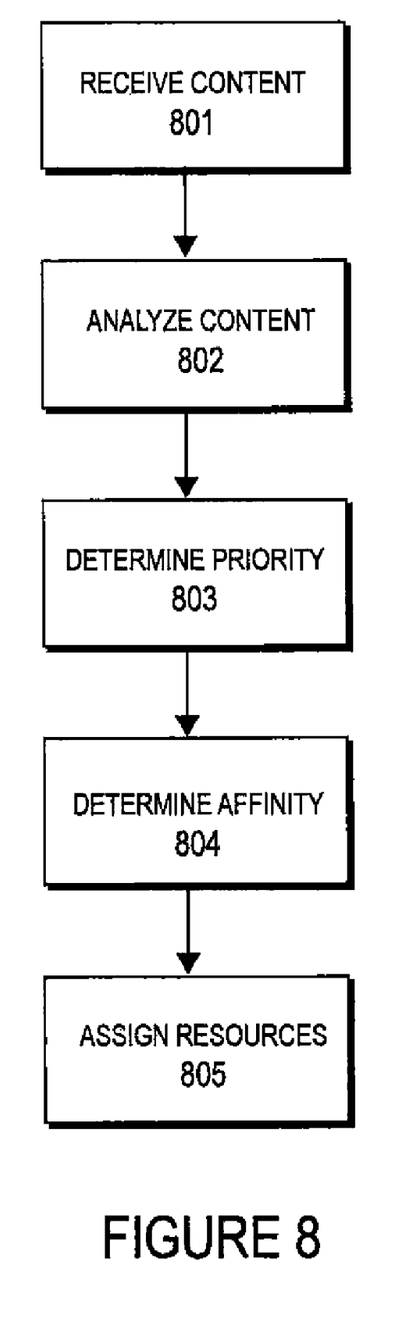
FIG. 8 is a flow diagram illustrating operation of an embodiment of the system.

FIG. 8 is a flow diagram illustrating the operation of an embodiment of the system. At step 801 the system receives content. At step 802 the content is analyzed and its destination and other metadata is analyzed and determined. At step 803 the Priority of the content is determined. At step 804 the Affinity of the content is determined. At step 805 resources are assigned to the content based on the Priority and Affinity values.

Priority

Priority means where this job lies relative to other jobs in the system. As the due date approaches, priority goes up. 0<Priority≦100. The higher priority a job has, the more likely it will be scheduled high in the queue. In one embodiment, the system uses the following to determine a Priority value to be used in scheduling.

$$\text{Priority} = \frac{V_{Content}}{\min(1, T_{Due} - (T_{Now} + T_{Proc} + T_{Transfer}))} \cdot 100$$

$V_{Content}$: the relative value of the content, $0 < V_{Content} \leq 1$. Content value is determined by examining the content owner's overall value and adjusted based on the relative priority of the specific content source.

$T_{Due}$: the time the processed content is due at it's destination.

$T_{Proc}$: the time required to process this content. Process time is determined by examining historical data on the time it takes to process files of the same type using the same transcoding resources.

$T_{Transfer}$: the time required to transfer this content to and from the transcoding farm. Transfer time is determined by examining historical data on the time it takes to transfer files from the current location to the selected cluster and transcoding resource.

$T_{Now}$: the current time.

Affinity

Where Priority determines the timing of a transcoding operation, Affinity determines the location and route through the system that a transcoding job will take, and can have some impact on the timing of a transcoding operation. Affinity may be determined by unique requirements, such as networking agreements or specialized equipment requirements. The determination of Affinity can be determined in one embodiment by the flow diagram of FIG. 6.

Figure 6:
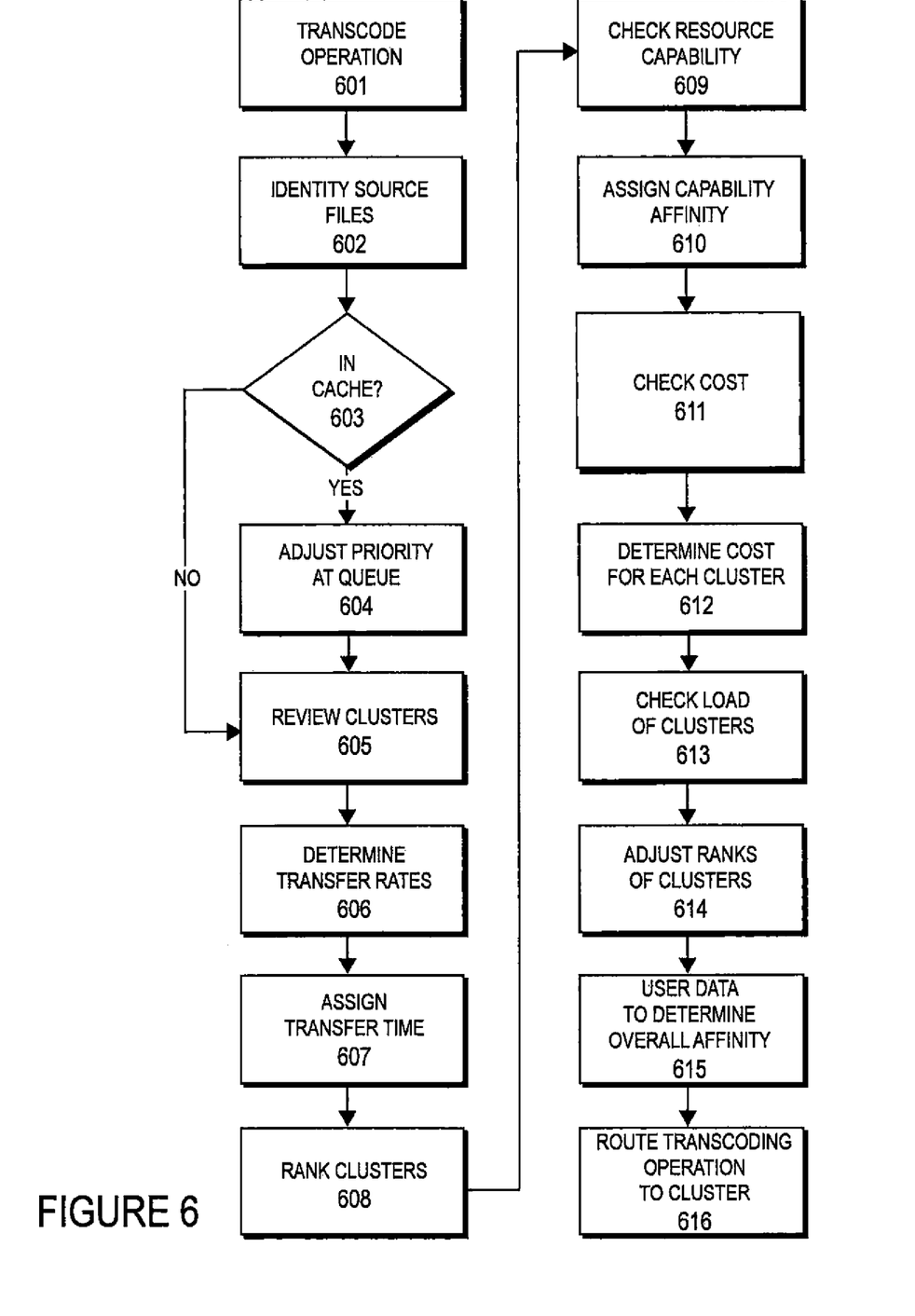
FIG. 6 is a flow diagram illustrating the operation of affinity in an embodiment of the system.

At step 601 a transcoding operation is examined. At step 602 the source files for that transcoding operation are identified. At decision block 603 it is determined if any of the source files are in cache at a transcoding resource. If so, that is if a transcoding resource already has a source file in cache (because a previous job required that file), pending jobs that also require that file are given precedence over similarly-prioritized pending jobs whose dependencies are not in cache. Therefore at step 604, the system will adjust the scheduling queue at that transcoding resource to give the highest priority to the transcoding operation that uses the cached source file.

If no transcoding resources have a source file in cache, the system proceeds to review clusters of transcoders at step 605. Jobs have affinity to a cluster of transcoders based on the time it will take to transfer the source files to the cluster. Each of the available transcoding clusters are examined and the transfer rates are identified at step 606. Each cluster is assigned a transfer time for the source file at step 607. (Note, if the source files are local to the cluster, the transfer time will be trivial, and transcoding resources in that cluster will have the highest affinity for that job.) At step 608 the clusters are ranked as possible transcoding sites based on the expected transfer times.

The system checks for transcoding resource capability at step 609. Certain transcoders or clusters my have specialized hardware or software for processing certain content profiles. These transcoding resources will have a higher affinity for jobs that they are specialized to process, and lower affinity for jobs that they aren't specialized for. If a transcoding resource is incapable of processing a certain type of content, it will have zero affinity and will not attempt to begin that job. The system assigns a capability affinity to each transcoding cluster at step 610.

The decision engine also considers the cost to process the job at step 611. Transcoding resources with higher cost have lower affinity for jobs, and lower-cost routes have higher affinity. The load of the transcoding resource or cluster is also taken into account. Jobs have a higher affinity for clusters/resources with lower loads. The system determines cost of each cluster at step 612 by reviewing work loads and expected processing cost for the transcoding operation at each of the clusters. At step 613 the system checks the loads of each cluster. The system adjusts the ranks the clusters in order of cost at step 614.

At step 615, the system uses the information from the transfer time rankings, capability affinity, and cost affinity, to arrive at an overall affinity of each cluster for the transcoding operation. The decision engine routes the job to the cluster/resource with the highest affinity at step 616.

Embodiment of Computer Execution Environment (Hardware)

Figure 7:
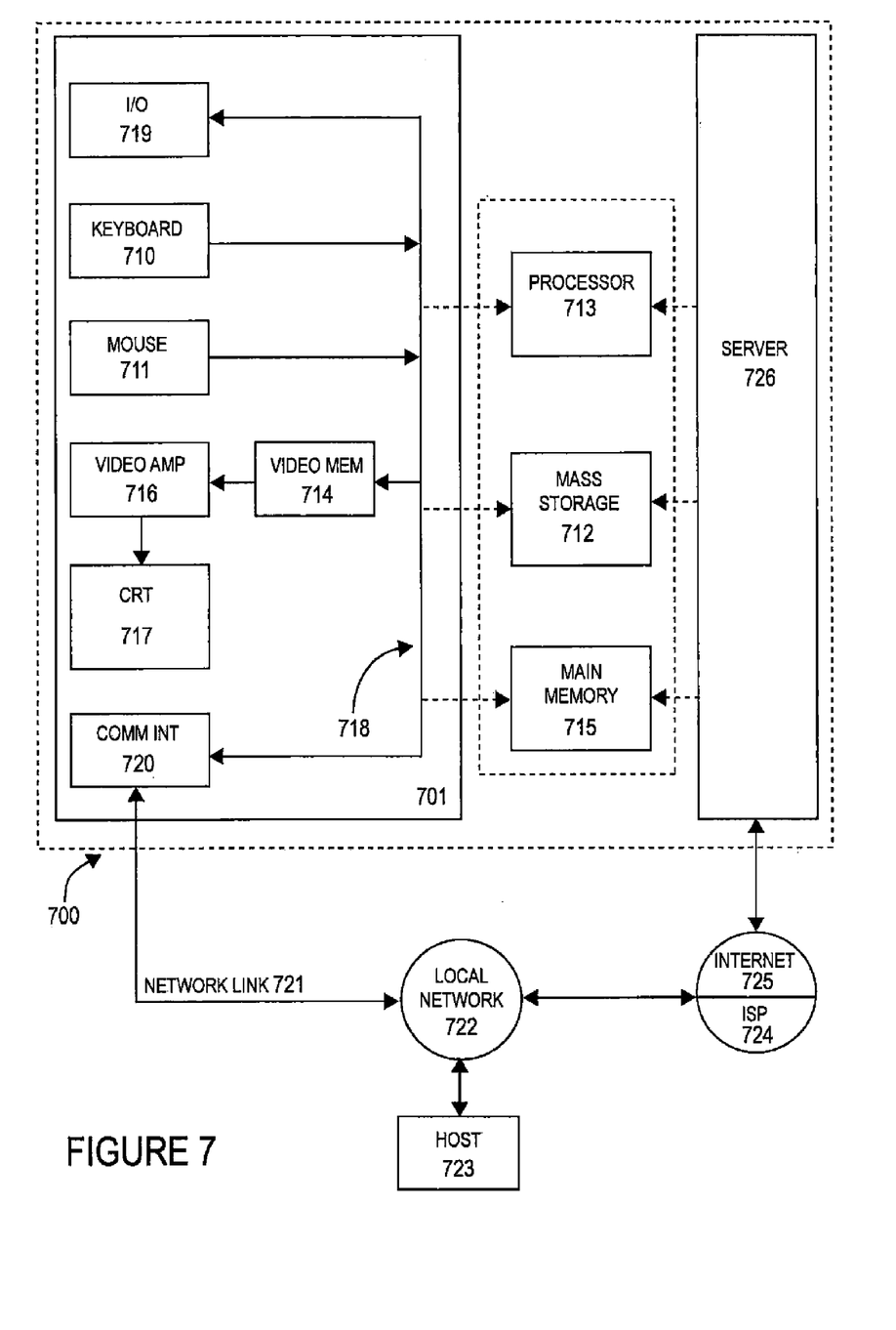
FIG. 7 is an example computer environment of an embodiment of the system.

An embodiment of the system can be implemented as computer software in the form of computer readable program code executed in a general purpose computing environment such as environment 700 illustrated in FIG. 7, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 710 and mouse 711 are coupled to a system bus 718. The keyboard and mouse are for introducing user input to the computer system and communicating that user input to central processing unit (CPU 713. Other suitable input devices may be used in addition to, or in place of, the mouse 711 and keyboard 710. I/O (input/output) unit 719 coupled to bi-directional system bus 718 represents such I/O elements as a printer, A/V (audio/video) I/O, etc.

Computer 701 may include a communication interface 720 coupled to bus 718. Communication interface 720 provides a two-way data communication coupling via a network link 721 to a local network 722. For example, if communication interface 720 is an integrated services digital network (ISDN) card or a modem, communication interface 720 provides a data communication connection to the corresponding type of telephone line, which comprises part of network link 721. If communication interface 720 is a local area network (LAN) card, communication interface 720 provides a data communication connection via network link 721 to a compatible LAN. Wireless links are also possible. In any such implementation, communication interface 720 sends and receives electrical, electromagnetic or optical signals which carry digital data streams representing various types of information.

Network link 721 typically provides data communication through one or more networks to other data devices. For example, network link 721 may provide a connection through local network 722 to local server computer 723 or to data equipment operated by ISP 724. ISP 724 in turn provides data communication services through the world wide packet data communication network now commonly referred to as the "Internet" 725 Local network 722 and Internet 725 both use electrical, electromagnetic or optical signals which carry digital data streams. The signals through the various networks and the signals on network link 721 and through communication interface 720, which carry the digital data to and from computer 700, are exemplary forms of carrier waves transporting the information.

Processor 713 may reside wholly on client computer 701 or wholly on server 726 or processor 713 may have its computational power distributed between computer 701 and server 726. Server 726 symbolically is represented in FIG. 7 as one unit, but server 726 can also be distributed between multiple "tiers". In one embodiment, server 726 comprises a middle and back tier where application logic executes in the middle tier and persistent data is obtained in the back tier. In the case where processor 713 resides wholly on server 726, the results of the computations performed by processor 713 are transmitted to computer 701 via Internet 725, Internet Service Provider (ISP) 724, local network 722 and communication interface 720. In this way, computer 701 is able to display the results of the computation to a user in the form of output.

Computer 701 includes a video memory 714, main memory 715 and mass storage 712, all coupled to bi-directional system bus 718 along with keyboard 710, mouse 711 and processor 713.

As with processor 713, in various computing environments, main memory 715 and mass storage 712, can reside wholly on server 726 or computer 701, or they may be distributed between the two. Examples of systems where processor 713, main memory 715, and mass storage 712 are distributed between computer 701 and server 726 include thin-client computing architectures and other personal digital assistants, Internet ready cellular phones and other Internet computing devices, and in platform independent computing environments.

The mass storage 712 may include both fixed and removable media, such as magnetic, optical or magnetic optical storage systems or any other available mass storage technology. The mass storage may be implemented as a RAID array or any other suitable storage means. Bus 718 may contain, for example, thirty-two address lines for addressing video memory 714 or main memory 715. The system bus 718 also includes, for example, a 32-bit data bus for transferring data between and among the components, such as processor 713, main memory 715, video memory 714 and mass storage 712. Alternatively, multiplex data/address lines may be used instead of separate data and address lines.

In one embodiment of the invention, the processor 713 is a microprocessor such as manufactured by Intel, AMD, Sun, etc. However, any other suitable microprocessor or microcomputer may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the cathode ray tube (CRT) raster monitor 717. Video amplifier 716 is well known in the art and may be implemented by any suitable apparatus. This circuitry converts pixel data stored in video memory 714 to a raster signal suitable for use by monitor 717. Monitor 717 is a type of monitor suitable for displaying graphic images.

Computer 701 can send messages and receive data, including program code, through the network(s), network link 721, and communication interface 720. In the Internet example, remote server computer 726 might transmit a requested code for an application program through Internet 725, ISP 724, local network 722 and communication interface 720. The received code maybe executed by processor 713 as it is received, and/or stored in mass storage 712, or other non-volatile storage for later execution. In this manner, computer 700 may obtain application code in the form of a carrier wave. Alternatively, remote server computer 726 may execute applications using processor 713, and utilize mass storage 712, and/or video memory 715. The results of the execution at server 726 are then transmitted through Internet 725, ISP 724, local network 722 and communication interface 720. In this example, computer 701 performs only input and output functions.

Application code may be embodied in any form of computer program product. A computer program product comprises a medium configured to store or transport computer readable code, or in which computer readable code may be embodied. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a network based video transcoding system has been described.

We claim:

1. A method for delivering content comprising:
in a computer implemented processing system:
determining a Priority value of the content;
determining an Affinity value of the content, the Affinity value representing a job preference of a given transcoder;
scheduling the content at a transcoder based on the Priority and Affinity values,
wherein the Priority value is given by:

$$\text{Priority} = \frac{V_{Content}}{\min(1, T_{Due} - (T_{Now} + T_{Proc} + T_{Transfer}))} \cdot 100$$

where
$0 < V_{Content} \leq 1$,
$V_{Content}$ represents a value associated with an owner of the content and adjusted based on a relative priority of the specific content source;
$T_{Due}$ is a time the processed content is due at a destination;
$T_{Proc}$ is a time required to process the content;
$T_{Transfer}$ is a time required to transfer the content to and from a transcoding farm; and
$T_{Now}$ is a current time.

2. The method of claim 1 wherein the Affinity value is based on a delivery time, a cost to process, and a load balancing of transcoding clusters associated with the content.

3. The method of claim 2 wherein transcoding clusters are distributed geographically on a network.

4. The method of claim 3 wherein the delivery time is dependent on a geographic location of a transcoding cluster.

5. The method of claim 4 wherein cost to process is dependent on the transcoding resources at a transcoding cluster.

6. The method of claim 5 wherein the load balancing is dependent on the number of transcoding operations scheduled at a transcoding cluster.

* * * * *